Patented Sept. 15, 1936

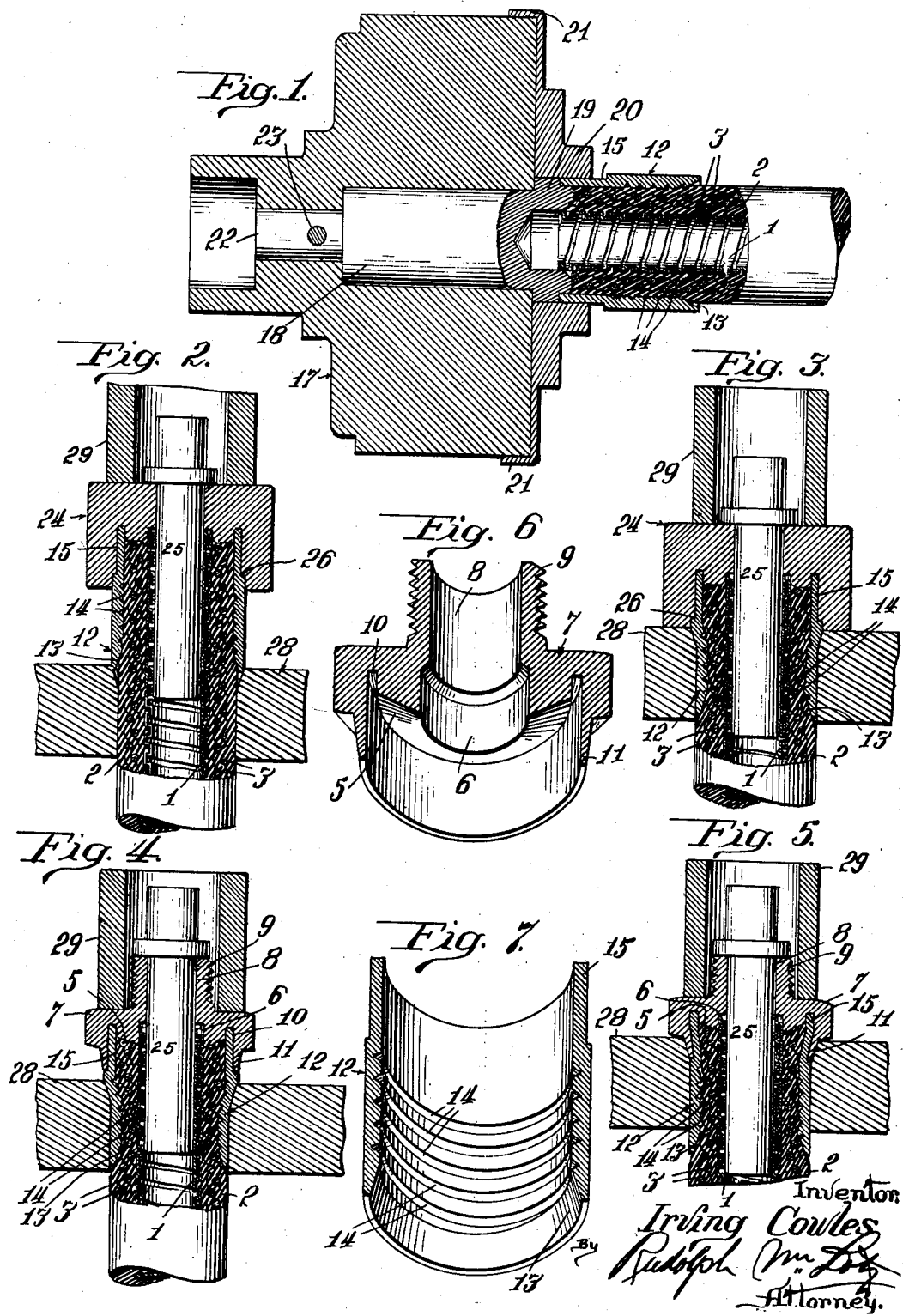

2,054,362

UNITED STATES PATENT OFFICE 2,054,362

FLEXIBLE CONDUIT AND METHOD OF MAKING

Irving Cowles, Detroit, Mich.

Original application July 13, 1933, Serial No. 680,200, now Patent No. 2,008,175, dated July 16, 1935. Divided and this application June 28, 1935, Serial No. 28,839

3 Claims. (Cl. 29—88.2)

This invention relates to improvements in flexible conduits adapted to be used for very high pressure purposes.

The main object of the invention is to produce a flexible conduit which is rendered leak-proof at the point or points at which leakage is most apt to occur under high fluid pressure within the conduit.

Other important and essential objects of the invention are pointed out in the following specification.

The method of the present invention is illustrated in and by the accompanying drawing, wherein:

Fig. 1 is a central, longitudinal section of a die or tool employed in assembling a piece of flexible conduit with one member of a hose coupling and discloses the first step in the method of the present invention and in part, the unfinished structure.

Figs. 2 and 3 are views similar to Fig. 1 illustrating the second and third steps of the method of the invention.

Figs. 4 and 5 illustrate the further steps of effecting completion of the assembly of the structure including another member of the coupling employed.

Fig. 5 shows the completed structure produced by the method aforesaid.

Fig. 6 is a central, longitudinal, perspective section of the body portion of the hose coupling employed.

Fig. 7 is a perspective, sectional view of a sleeve constituting a part of the coupling structure.

This application is a division of my original application for patent Serial No. 680,200, filed the 13th day of July, 1933, which eventuated in the issuance of Patent No. 2,008,175 dated the 16th day July, 1935.

By reference to the drawing it will be noted (Fig. 5) that the flexible portion of the conduit structure consists of a well-known type of metal lined rubber hose wherein the inner wall 1 consists of a pair of channeled strips disposed in opposed overlapped relation to form a continuous helical wall structure which is encased in the rubber tube 2. The latter may include a wire reinforcement 3 embedded therein, as shown in Fig. 5, or may be devoid of such reinforcement. Generally speaking, the rubber casing 2 is wrapped with a textile covering, but omitted from Fig. 5.

The flexibility of the wall 1 is such that contraction thereof will occur under the influence of radial pressure on the external surface of the casing 2 such as is relied upon generally to provide a fluid tight joint between the flexible conduit and the metal coupling at the ends of the latter, thus limiting the degree of such external pressure to a point less than that which will cause the wall 1 to contract. Accordingly, the said contracting pressure of the coupling sleeve is insufficient to prevent leakage under the influence of a high degree of fluid pressure within the conduit structure. This is due to the fact that the fluid under very high pressure will penetrate through or past the wall 1 and past the end of the rubber casing 2 where it abuts the opposed wall of the metal coupling and thus finds its way to the inner face of the tubular wall of the coupling which is compressed against the outer surface of the rubber wall 2 and, where this occurs leakage will result.

In the case of reinforced hose, such as is illustrated in Fig. 5, the fluid under pressure passing between the end of the rubber wall 2 and the opposed wall of the coupling, will penetrate said rubber wall around the wires of the reinforcing structure 3 and will soon destroy the portion of the wall 2 outwardly of the reinforcement 3 and within and beyond the coupling structure.

Obviously, if the wall 2 is wrapped with fabric and the latter extends to the end of the hose within the coupling, the penetration of fluid between the end of the hose and the opposed wall of the coupling will follow the fabric wrapping very easily and cause leakage.

The main object of the invention is, therefore, to provide a method of assembling a flexible conduit in such a manner as to prevent leakage of fluid past the annular shoulder 5 of the coupling (which is opposed to the end of the rubber wall 2 of the flexible conduit) and the throat 6 of the coupling into which the lining 1 projects (see Fig. 6).

This is accomplished by crowding the wall 2 against the shoulder 5 with sufficient permanently maintained force to prevent leakage as aforesaid under the influence of hose-bursting pressure, as shown in Fig. 5.

I am aware that the prior art discloses conduit structures wherein the end of the rubber wall of the hose abuts a shoulder similar to the shoulder 5 of the couplings illustrated in the accompanying drawing, but I do not know of any prior art disclosure of structure and method of assembly of hose and coupling capable of producing the result which I attain by means of the present invention.

The coupling, per se, comprises the body portion 7 provided with a central bore 8 of a diameter substantially equal to that of the wall 1 of the conduit and which is concentric with the throat 6 and communicates therewith; the threaded nipple 9 shown as a male connecting member; the annular grove 10 bordering the annular shoulder 5; the outer annular flange 11 having an inner cylindrical face flush with the outer wall of the groove 10 and which is tapered externally; and the sleeve 12.

The said sleeve 12 is initially cylindrical internally and is provided at one end with a flared mouth 13 and, between its ends, with annular grooves 14 which are spaced from the other end of the sleeve. Externally said sleeve 12 is also initially cylindrical and of slightly larger diameter than the inner diameter of the flange 11 of the coupling except along the end portion 15 of said sleeve which is adapted to be received telescopically within said flange 11 and the annular groove 10.

The assembly of the flexible conduit structure is effected as follows:

A die (Fig. 1) is provided which consists of a heavy cylindrical block 17 of steel which is equipped with a central opening which receives the shank 18 of a head 19 of larger diameter than said shank 18 and which corresponds substantially in shape and in size with that portion of the coupling lying within the cylindrical plane of the inner surface of the flange 11 except as described hereinafter. This head is disposed telescopically within the central opening of a head 20 which is equipped with an outer annular flange 21 within which one end portion of the block 17 is received telescopically.

The shank 18 terminates in a smaller diameter shank 22 which is received telescopically within a portion of the central opening of the block 17 and is secured therein by means of the cross-pin 23.

It will be noted that the heads 19 and 20 cooperate with each other to define an annular groove corresponding to the groove 10 of the coupling, but of appreciably less depth than the latter. This groove receives a part of the end portion 15 of the sleeve 11 and said sleeve receives an end portion of the hose.

It will be observed by reference to Fig. 1 that the rubber wall 2 of the hose has been cut away so that the inner wall 1 thereof projects from the body of the hose so that when the hose has been inserted into the sleeve 11 until the rubber wall engages the opposed annular shoulder of the head 19 which corresponds substantially with the annular shoulder 5 of the coupling, the projecting end of the wall 1 is disposed within the central aperture of the head 19 which corresponds to the throat 6 of the coupling.

The hose fits the sleeve 11 so snugly that said sleeve will remain firmly in place on the hose as said sleeve and hose are withdrawn from the heads 19 and 20 and are inserted into the die 24 shown in Fig. 2. Said die 24 corresponds in shape and size with the portions of the heads 19 and 20 which cooperate to position the sleeve upon the hose as described above, the outer annular flange 5 of the die 24 being of length and shape to receive all of the end portion 15 and part of the body portion of the sleeve 11 and is equipped with an internal shoulder 26 against which the shoulder 16 of the sleeve 11 abuts.

A mandrel 25 is mounted in the die 24 and is received telescopically in the bore of the hose for a length in excess of the sleeve 11.

The die 24 is disposed above a suitable sleeve contracting die 28 and is forced downwardly by means of the plunger 29 of a punch press to cause the outer end portion of the sleeve 12 to be contracted upon the hose as illustrated in Fig. 3.

This progressive contraction of the sleeve 11 effects a displacement of the rubber of the wall 10 2 and crowds the displaced material inwardly and against the annular shoulder of the die 24 which is opposed to the end of said rubber wall.

It will be apparent that the annular shoulders of the dies 19 and 24 which are opposed to the rubber wall 2 of the hose, are shaped differently than the annular shoulder 5 of the coupling and also that the depth of the annular groove 10 of the latter is of greater depth than the similar grooves of the aforesaid dies.

The operation illustrated in Figs. 2 and 3, as above described, serves to cause the sleeve 12 to be mounted so firmly on the hose as to prevent any relative movement between said sleeve and hose in performing the final step of the method of this invention.

The latter consists in leaving the sleeve 12 and the hose secured therein in the die 28, withdrawing the die 24, then mounting the coupling upon the sleeve and hose assembly as shown in Fig. 4 wherein said coupling is shown as forced down upon the sleeve 12 to final position by means of the plunger 29 during the initial downward stroke thereof, the continuation of said stroke causing the flange 11 of the coupling to be contracted upon the tapered portion of the thinner end portion 15 of the sleeve 12 to complete the assembly.

Obviously, the die 28 must consist of separable members which are held suitably against separation during the aforesaid assembly operations which are effected at both ends of a hose length to complete the conduit for commercial use.

In the final operation, as illustrated in Figs. 4 and 5, the rubber wall 2 of the hose and the reinforcing means, if any, embedded therein are crowded back to a very appreciable extent under a degree of pressure or force exceeding the greatest degree of fluid pressure that the hose will stand without bursting and, consequently, the fluid under pressure disposed within the hose cannot possibly leak past the meeting point of the outer edge of the shoulder 5 and the annular groove 10 of the coupling.

I claim as my invention:

1. The method of making fluid-tight, flexible conduits which consists in providing a coupling member for each end of the conduit presenting an annular shoulder opposed to an extremity of the conduit and equipped with an annular contractible shell of larger inner diameter than the hose and adapted to receive a portion of the latter, then mounting and securing upon the hose end a contractible sleeve in predetermined spaced relation to the extremity of the hose, then inserting an end portion of the tubular member into the annular flange of the coupling member to bring the extremity of the hose into contact with said annular shoulder, then moving said tubular member farther into said flange for compressing said hose extremity against the shoulder with a force sufficient to change the position of said extremity relative to the tubular member, and then, while maintaining said tubular member in said last-named position, contracting said flange into permanent engagement with said tubular member.

2. The method of making fluid-tight, flexible conduits which consists in providing coupling members for each end portion of a hose, each consisting of two members, one thereof, comprising a body portion equipped with a substantially cylindrical contractible shell and with an annular cylindrical groove having its outer wall flush with the inner surface of said shell and surrounding an annular shoulder adapted to engage an extremity of the hose, and the other member of said coupling consisting of a contractible sleeve of an outer diameter substantially equal to the inner diameter of the said shell, said sleeve being of a length greater than the distance separating the outer end of the shell from the bottom of said groove, said method consisting in first contracting one end portion of said sleeve upon an end portion of the hose, while said sleeve projects beyond an extremity of the hose a distance less than that of the bottom of said groove in the said shoulder, then inserting the last-named end portion of the sleeve into the shell until the extremity of the hose abuts against said shoulder, then forcing said sleeve into said shell and groove to a position wherein the hose extremity is forced back into said sleeve and while holding said sleeve in said last-named position, contracting said shell into permanent engagement with said sleeve.

3. The method of making fluid-tight, flexible conduits which consists in providing a flexible hose length, a two piece coupling for each end portion of the hose, each coupling including a body member equipped with cylindrical contractible shell bordering an annular shoulder opposed to an extremity of the hose, and a substantially cylindrical contractible sleeve of greater length than said shell and adapted to be received telescopically within the latter along one end portion, said method consisting in first contracting one end portion of a sleeve upon an end portion of the hose while maintaining said sleeve with one end thereof spaced the adjacent extremity of the hose a distance less than the spacing of the said shoulder from the outer end of said shell, then inserting said last-named end portion of said sleeve into said shell until the extremity of the hose abuts said shoulder, then forcing said sleeve farther into said shell and contracting the latter into permanent engagement with said sleeve to retain the same in said last-named position.

IRVING COWLES.